Aug. 28, 1951  W. J. JACOBSSON  2,565,560
MULTIPLE STAGE PRESSURE REGULATOR
Filed Oct. 16, 1946
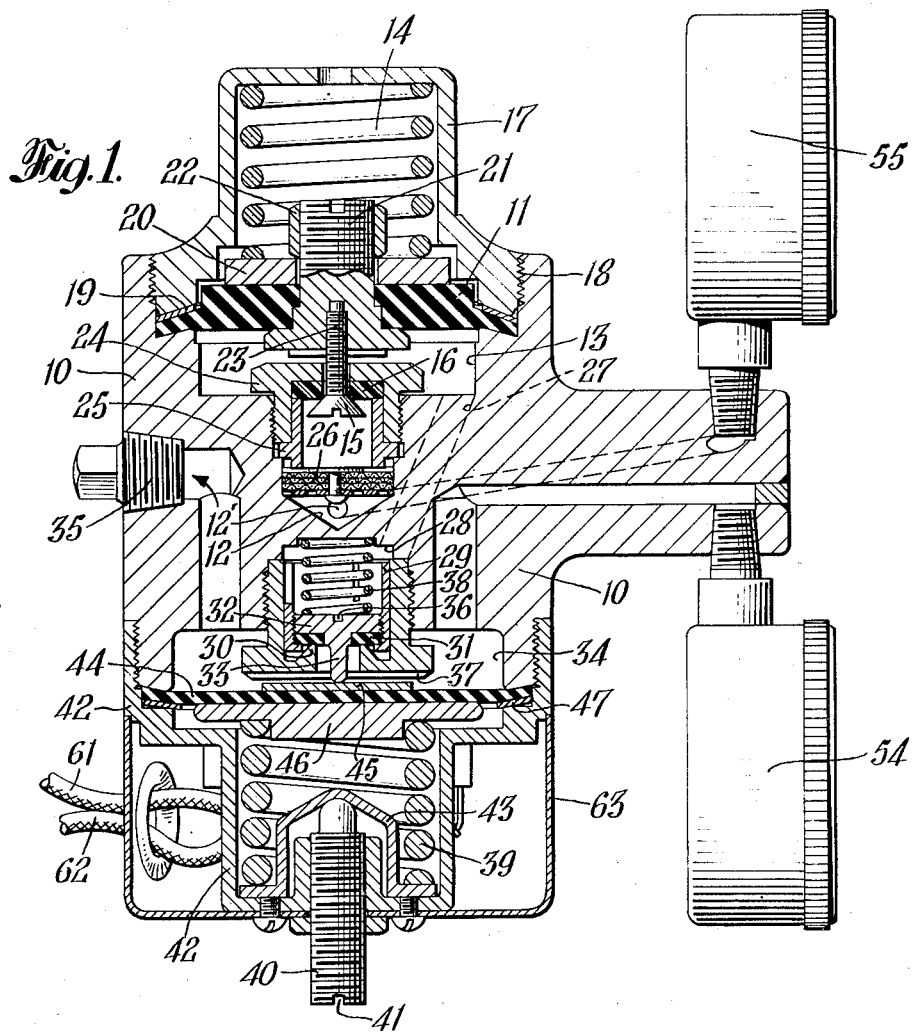
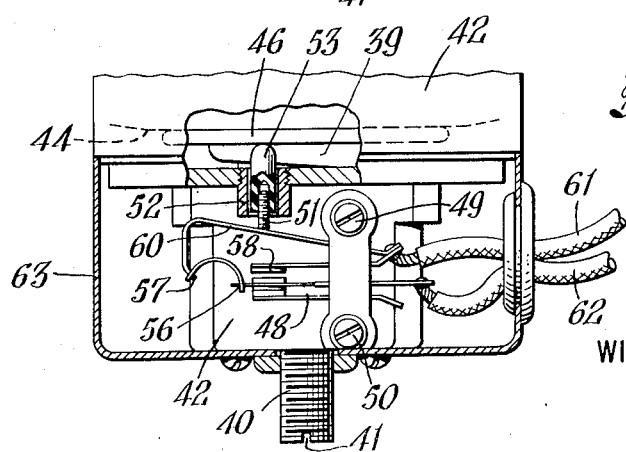
INVENTOR
WILGOT J. JACOBSSON
BY
ATTORNEY Patented Aug. 28, 1951

2,565,560

UNITED STATES PATENT OFFICE 2,565,560

MULTIPLE STAGE PRESSURE REGULATOR

Wilgot J. Jacobsson, Plainfield, N. J., assignor, by mesne assignments, to Union Carbide and Carbon Corporation, a corporation of New York Application October 16, 1946, Serial No. 703,647

4 Claims. (Cl. 50—10)

This invention relates to a two-stage fluid-pressure regulator and has for an object to provide a method and apparatus adapted especially for handling carbon dioxide gas. Another object is to provide a safety electrical cut-out for apparatus with which said regulator may be used whereby on drop of said pressure below a desired value, said cut-out switch is actuated. Yet a further object is to provide a single adjusting means for the switch and second stage valve of the regulator whereby both the valve and switch may have their pressure settings simultaneously adjusted.

In adjusting the fluid pressure regulator for operation upon carbon dioxide gas for use in the soft drink industry it was found that a compact construction adapted for vending machines and other uses was in danger of having snow formed on the stationary and movable valve parts and on the control diaphragm. This is due to the creation of cold or the absorption of heat accompanying the expansion of gas and the fact that solid carbon dioxide may form at a much higher temperature than that at which air and many other gases solidify.

In searching for a practical apparatus for this purpose one suggestion was that separate pressure responsive means for the regulating valve and fluid switch be provided. An objection to this suggestion is the necessity of an operator having to make two adjustments when a change in the pressure setting is desired for both the valve and switch.

According to the present invention it has been discovered that the effects of snow formation may be reduced and a compact and easily adjusted apparatus provided. Specifically it has been found that when carbon dioxide gas is reduced from its initial pressure of around 700 to 2000 p. s. i. the effects of snow will not be so objectionable if the reduction in pressure is accomplished in two stages in which the first stage is a reduction in pressure to between 150 and 250 p. s. i. and the next reduction to between 15 to 100 p. s. i. takes place in the second or low pressure stage of the regulator. Ease of adjustment in the pressure setting has been obtained by having a single adjustment screw controlling the pressure at which the valve and switch are responsive and the switch operated by the diaphragm of the second stage or low pressure valve of the regulator.

Referring to the drawings:

Fig. 1 is a longitudinal section through one embodiment of this invention;

Fig. 2 is a view of the switch located on the opposite side of the housing in Fig. 1.

A suitable body or housing 10 for a two stage regulator encloses a high pressure diaphragm 11 and high pressure chamber 12 having a fluid inlet 12' that is constructed to be connected by a conventional nipple (not shown) to a container of fluid under high pressure e. g., a cylinder containing carbon dioxide gas at a pressure between 700 and 2000 p. s. i. After passing the high pressure valve 15 fluid escaped to the intermediate pressure chamber 13 and thence to the low pressure valve. A usual coil spring 14 assists the diaphragm 11 in opening against the pressure in the chamber 13 for opening the valve 15. This valve 15 is preferably made of stainless steel having a threaded stem and conical head as illustrated. The seat 16 with which the valve cooperates is preferably formed of a material such as a laminated paper base phenolic condensation product having flexibility with minimum change in its characteristics with the temperature drop due to the expanding carbon dioxide or other fluid for which the regulator is adapted to be used. Such a material is known in the trade as "Textolite." Surrounding the spring 14 is an adjusting cap 17 threaded into the housing 10 at 18 and clamping the edge portion of the diaphragm 11 with the aid of the sealing ring 19 as illustrated. A disc plate 20 is placed between the spring 14 and diaphragm 11 to receive the thrust of the spring and transmit it over a substantial area of the diaphragm surface. This plate 20 is clamped to the diaphragm by means of the diaphragm adjusting screw 21 having a lower headed portion as shown in the drawing and provided with a threaded shank for receiving the diaphragm nut 22. The valve stem 23 is threaded into the head of the adjusting screw 21. To hold the molded seat material 16 in place a seat locking screw 24 is provided with threads to engage the corresponding threads in the housing 10 as shown in the drawing for clamping a sleeve 25 in position to retain the seat material 16 against the upper edge of said sleeve. A suitable filter screen 26 is provided between the high pressure chamber 12 and the sleeve 25 in order to prevent any dirt or impurities from becoming wedged in between valve 15 and its seat 16.

From the intermediate pressure chamber 13 a passage 27 leads to the portion of the intermediate pressure chamber 28 which is adjacent the lower pressure or second stage valve. The valve holding sleeve 29 is slotted throughout the upper portion of its length as indicated in the drawing by slots about 60° apart for the purpose of having the slotted portion flared outwardly to frictionally engage the surrounding sleeve of the stationary part of the valve which has formed at its lower end the inwardly projecting nozzle portion 30. The sleeve 29 thus functions to reduce any tendency to hum which the valve may have. This outer sleeve containing the nozzle portion is threaded into the housing as shown in the drawing. The face of the movable valve part or seat 32 which cooperates with the stationary nozzle 30 is provided with a soft synthetic or other rubber material 31 capable of providing an effective seal for the valve when closed. Such a rubber material is known in the trade as "neoprene." The main body portion 32 of the movable element is threaded to the valve holder 29 so that the inner sleeve 29 slides within the outer sleeve which has the nozzle 30 integral therewith at its lower end. The sliding fit between the unslotted portion of sleeve 29 and the surrounding sleeve is loose enough for the fluid to move between these sleeves. The upper or slotted portion of the sleeve 29 provides the necessary friction for the inner sleeve to overcome any hum the movable valve element might otherwise have.

A valve stem 33 projects from the movable element 32 through the nozzle 30 for actuation by the diaphragm 44. The low pressure chamber 34 is at the delivery pressure of the fluid after it has passed the movable valve part 32, and after it has entered the recess surrounding the stationary nozzle portion 30 and passed between the nozzle 30 and the valve seat 31. From the low pressure chamber fluid enters the passage illustrated leading to the threaded outlet opening 35 to which the delivery pipe is to be attached. In shipping the regulator this delivery passage is closed by a screw plug as shown in the drawing, which of course is removed before the delivery pipe is connected. The movable valve part 32 is adjustable in its sleeve 29 upon application of a screwdriver to the slot 36 when its movable part has been removed from the housing with the outer sleeve. A similar slot 37 found on the outside of the hexagonal head of the outer sleeve has the additional function of serving as a gas passage when the plate 45 engages the nozzle bushing 30, thus insuring movement of gas into the low pressure chamber 34. A coil spring 38 cooperates with the housing and with the movable part 32 to normally urge this valve part to its closed position. Another coil spring 39 cooperates with the diaphragm 44 and housing 10 for the purpose of assisting the diaphragm in opening the valve for admission of gas to the low pressure chamber. A cap 42 is threaded onto the housing, provided with a reduced end portion and enclosing the spring 39. Within the cap 42 is arranged a washer 43 placed between the adjusting screw 40 and the spring 39. The outer end portion of this adjusting screw has a notch 41 for insertion of a screwdriver whereby tension of the spring 39 may be adjusted. Contiguous the upper side of the lower pressure diaphragm 44 is an upper plate 45 which is engaged with the valve stem 33. On the lower side of this diaphragm is the lower plate 46 of the shape indicated for transmitting pressure of the spring 39 to the diaphragm. The edge portion of this diaphragm is provided with a ring 47.

Secured to the outside of the reduced portion of the housing cap 42 is a toggle operated type snap switch 48 for opening a circuit when the fluid pressure has fallen a predetermined few pounds below the pressure at which the second stage valve opens. This switch is secured to the cap 42 by screws 49 and 50 as shown in Fig. 2 of the drawing. This switch is actuated in response to movement of the diaphragm plate 46 through pin 53 and screw 51 engaging the spring strip 60. The pin 53 slides freely within the bushing 52, said pin being preferably of an insulating material such as vinylidiene chloride and known in the trade as Saran. A pressure gauge 54 indicates the pressure of the fluid in the low pressure chamber 34. Another gauge 55 indicates the high pressure on the fluid before it has passed through the filter element 26. While not shown a third gauge connected with the intermediate pressure chamber 13 or 28 may also be provided.

The two pivotal portions 56 and 57 forming the toggle of the switch are shown in the drawing as being in a position for maintaining the circuit open with the central contact engaging the lower contact. Upon increasing the delivery pressure to a value such that the second stage valve is about closed, pressure of the diaphragm 44 upon the lower plate 46 moves the pin 53 and screw 51 downward also moving the leaf spring 60 downward bringing toggle pivot 57 below pivot 56 and causing the central contact 48 to be quickly snapped upwardly engaging the upper contact 58 and closing the circuit formed through the connected leads 61 and 62. Where the regulator is used in connection with carbon dioxide for a soft drink dispenser, the leads 61 and 62 are connected in circuit with an electric motor of a dispenser, and when the gas pressure in the delivery chamber falls below a predetermined value then the switch opens the motor circuit to render the dispenser inoperative. A cover 63 fits over the reduced end of the cap 42 and is secured to its bottom end by screws which hold it in place surrounding the switch 48 as illustrated.

To set the switch 48 so that it will break the electrical circuit at say 6 p. s. i. below the required delivery pressure instead of the more usual 4 pounds, the delivery pressure is first set to 60 p. s. i. for example as indicated on the gauge 54. If this is not already the case it may be attained by adjustment of the screw 40 until the desired pressure exists in the delivery chamber. To allow escape of fluid at only the desired rate for maintaining such pressure, a flowmeter or an orifice of known capacity is mounted in the outlet passage 35. For example, a No. 61 drill orifice in the outlet should sufficiently throttle the fluid passing in the outlet to give the desired pressure in the low pressure or delivery chamber. Upon adjustment of the screw 51 until the switch just breaks contact at 6 pounds below the delivery pressure, the apparatus will be adjusted to function in the desired manner.

Among the advantages of this invention may be mentioned the provision of an improved sensitive two stage pressure reducing valve having minimum creep. Some usual form of blowout disc not illustrated may be used in conjunction with the delivery chamber to safeguard the same against undesirable rise in pressure. Another feature of this invention is the provision of a single adjusting screw 40 capable of varying the pressure adjustment for both the second stage valve and the switch 48. In addition to one adjustment for both the valve and the switch, another advantage is the accessibility of this adjusting screw 40 through the outside of the housing. The quick opening switch adapts it for use with alternating current of ordinary housewiring when a small movement actuates it. The second stage valve opens and closes with movement of only .001" which is less than the movement necessary to actuate the switch. The second stage valve adjusting spring is chosen to allow the switch to open and close with diaphragm movement of only .01", which corresponds to a pressure change of 4 p. s. i. in the low pressure chamber. Movement of only that amount to actuate a switch requires a snap type switch to avoid objectionable arcing at the switch contacts. The switch closes at 2 p. s. i. below the delivery pressure. This corresponds to a .005" diaphragm movement and is .004"-.005" below the operating level of the diaphragm plate. The switch opens at 6 p. s. i. below the delivery pressure. This corresponds to a .015" diaphragm movement and the switch contact location is .014"-.015" below the operating level of the diaphragm plate. So in no case does the switch function during ordinary operation of the regulator. When, however, due to lack of $CO_2$ in the cylinder, the delivery pressure falls to 6 p. s. i. below the set delivery pressure, the diaphragm plate moves .014" to .015" below its operating level and the switch opens.

I claim:

1. A multistage fluid pressure regulator comprising at least two regulating valves in series each of which includes a pressure responsive diaphragm, a stationary part, a movable valve part cooperating with said stationary part, a stem between each said movable valve part and its diaphragm, a housing for both diaphragms and its valve parts, a spring cooperating with said housing and one of said diaphragms, an electric switch responsive to movement of said one of said diaphragms, and means for adjusting the stress in said spring to adjust the pressures at which a valve and said switch is actuated.

2. The combination with a fluid pressure regulating valve comprising a diaphragm, a tubular stationary valve part forming a nozzle directed away from said diaphragm, a movable valve part slidable in said tubular part, a stem between said movable valve part and diaphragm, the face of said movable valve part engaging said nozzle seat and being of soft rubber, a housing for said valve having a reduced end portion enclosing a spring cooperating with said housing and diaphragm, a snap switch secured to the outside of the reduced housing portion, a pin passing through said housing for actuating said switch and engaging said diaphragm whereby the switch is actuated by small movement of said diaphragm, and a cover enclosing the switch and reduced end portion of said housing.

3. A two stage fluid pressure regulating valve having its high pressure valve of stainless steel cooperating with a stationary seat of a paper base phenolic condensation product and its low pressure valve provided with a stationary nozzle type element with which a movable valve element having a soft rubber-like face cooperates, a snap switch secured to said regulating valve for actuation by pressure responsive mechanism of the second stage or low pressure valve at a pressure slightly below that at which said second stage valve opens.

4. A method of operating fluid pressure regulators in series when the fluid whose pressure is being reduced is carbon dioxide and when the first pressure regulator includes a valve of the stem type, and the second pressure regulator includes a valve of the nozzle type, said method comprising dropping the pressure at the first regulator from a storage pressure of between 700 and 2000 pounds per square inch to a pressure of between 150 and 250 pounds per square inch, i. e., to a pressure of about 200 pounds per square inch intermediate said regulators, and then reducing the pressure at the second regulator to a desired level between 15 and 100 pounds per square inch outlet pressure, both reductions in pressure being carried on substantially simultaneously, whereby a more nearly uniform outlet pressure is obtainable in the presence of snow forming tendency at the first pressure regulator valve.

WILGOT J. JACOBSSON.

REFERENCES CITED

The following references are of record in the file of this patent:

UNITED STATES PATENTS

| Number | Name | Date |
|---|---|---|
| 806,478 | Marshall | Dec. 5, 1905 |
| 1,148,464 | Sayer | July 27, 1915 |
| 1,938,327 | Green | Dec. 5, 1933 |
| 2,057,133 | Bryce | Oct. 13, 1936 |
| 2,173,082 | Kalischer | Sept. 12, 1939 |
| 2,195,728 | Jones | Apr. 2, 1940 |
| 2,327,069 | Satterlee | Aug. 17, 1943 |
| 2,405,142 | Holt | Aug. 6, 1946 |
| 2,422,342 | Dillman | June 17, 1947 |